United States Patent
Jeong et al.

(10) Patent No.: US 9,349,363 B2
(45) Date of Patent: May 24, 2016

(54) AUDIO SIGNAL PROCESSING SYSTEM AND ECHO SIGNAL REMOVING METHOD THEREOF

(71) Applicant: SAMSUNG ELECTRONICS CO., LTD., Suwon-si (KR)

(72) Inventors: Jae-hoon Jeong, Yongin-si (KR); Andreas Schwarz, Erlangen (DE); Walter Kellermann, Erlangen (DE)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 13/937,521

(22) Filed: Jul. 9, 2013

(65) Prior Publication Data
US 2014/0010382 A1   Jan. 9, 2014

(30) Foreign Application Priority Data

Jul. 9, 2012   (KR) .......................... 10-2012-0074629

(51) Int. Cl.
*H04B 3/20*   (2006.01)
*G10K 11/16*   (2006.01)
*H04M 9/08*   (2006.01)
(Continued)

(52) U.S. Cl.
CPC ................ *G10K 11/16* (2013.01); *H04M 9/082* (2013.01); *H04R 3/02* (2013.01); *H04R 3/04* (2013.01); *H04R 3/12* (2013.01); *H04R 2499/11* (2013.01); *H04R 2499/15* (2013.01)

(58) Field of Classification Search
CPC ......... G10K 11/16; H04M 9/082; H04R 3/02; H04R 3/04; H04R 3/12; H04R 2499/11; H04R 2499/15
USPC ......... 381/66, 83, 93, 96; 379/406.01–406.16
See application file for complete search history.

(56) References Cited

U.S. PATENT DOCUMENTS

| | | |
|---|---|---|
| 6,700,978 B2 | 3/2004 | Bershad et al. |
| 6,928,160 B2 | 8/2005 | Ebenezer et al. |

(Continued)

FOREIGN PATENT DOCUMENTS

| | | |
|---|---|---|
| KR | 1020110102474 A | 9/2011 |
| WO | 0221717 A2 | 3/2002 |

OTHER PUBLICATIONS

"Joint delay and impulse response estimation using sliding RLS filters", Signal Processing, vol. 80, Issue 8, Aug. 2000, pp. 1489-1500, ISSN 0165-1684.

(Continued)

*Primary Examiner* — Vivian Chin
*Assistant Examiner* — Ammar Hamid
(74) *Attorney, Agent, or Firm* — Sughrue Mion, PLLC

(57) ABSTRACT

An audio signal processing system and an echo signal removing method thereof are provided. The audio signal processing system includes a speaker that is configured to output an audio signal; a microphone that is configured to receive the audio signal output by the speaker including an echo signal generated by the audio signal; an echo signal delay unit that is configured to delay the echo signal for a bulk delay time, and output the echo signal that is delayed; and an echo signal removing unit that is configured to remove the echo signal that is delayed and output by the echo signal delay unit from the audio signal received by the microphone, wherein the echo signal delay unit includes a bulk delay measuring unit that is configured to measure a bulk delay by analyzing impulse response characteristics of an echo path.

11 Claims, 9 Drawing Sheets

(51) Int. Cl.
  *H04R 3/02* (2006.01)
  *H04R 3/04* (2006.01)
  *H04R 27/00* (2006.01)
  *H04R 3/12* (2006.01)

(56) References Cited

U.S. PATENT DOCUMENTS

| | | | |
|---|---|---|---|
| 7,945,066 B2 | 5/2011 | Kindred | |
| 2002/0071547 A1 | 6/2002 | Bershad et al. | |
| 2004/0252652 A1 | 12/2004 | Berestesky et al. | |
| 2005/0265568 A1* | 12/2005 | Kindred | H04R 25/453 |
| | | | 381/318 |
| 2010/0135481 A1* | 6/2010 | Frauenthal | H04B 3/23 |
| | | | 379/406.06 |
| 2011/0311066 A1* | 12/2011 | Nagy | H04B 3/23 |
| | | | 381/66 |
| 2012/0250872 A1* | 10/2012 | LeBlanc | H04M 9/082 |
| | | | 381/71.1 |

OTHER PUBLICATIONS

ITU-T Recommendation G.168, Jan. 2007, 120 pages total.

Sung Jae Na, "Real-Time implementation of network echo canceller using bulk delay estimation", Dissertation for Yonsei University, Jun. 2002, 81 pages total.

* cited by examiner

AUDIO SIGNAL PROCESSING SYSTEM AND ECHO SIGNAL REMOVING METHOD THEREOF

CROSS-REFERENCE TO RELATED APPLICATIONS

This application claims priority from Korean Patent Application No. 2012-0074629 filed Jul. 9, 2012 in the Korean Intellectual Property Office, the disclosure of which is incorporated herein by reference in its entirety.

BACKGROUND

1. Field

Systems, apparatuses and methods consistent with exemplary embodiments relate to an audio signal processing system and an echo signal removing method thereof, and more particularly, to an audio signal processing system to remove an echo signal that is output from a speaker and is input into a microphone and an echo signal removing method thereof.

2. Description of the Related Art

Due to developments in communication technology and sound technology, a voice call system that allows call and conversation to be performed between speakers which are located apart from each other has been widely used. Also, in recent years, voice recognition technology that controls electronic apparatuses by using a user's voice has been widely used.

The voice call system and electronic apparatuses includes at least one speaker and at least one microphone, respectively. Particularly, in the apparatuses including both the speaker and microphone, a voice signal output from the speaker may be received by the microphone of the same apparatuses. If the operation is repeated in a cycle, an echo phenomenon that a voice output from the speaker is received through the microphone with a voice that a user utters may occur.

As a result, in the case of the acoustic system to perform call and conversation between speakers that are spaced apart from each other, a howling phenomenon that a user's voice sounds like an echo may occur. Also, in the case of the electronic apparatus that is controlled by the user's voice, a misrecognition phenomenon that the electronic apparatus does not properly recognize the voice uttered by the user may occur.

Recently, in order to prevent the echo phenomenon, echo cancellation technology is applied to the apparatuses equipped with both the speaker and the microphone.

Particularly, the echo cancellation technology is applied to an audio signal processing system which uses an adaptive filter. The system using the adaptive filter obtains impulse response characteristics with respect to passing sound (echo path) between the speaker and the microphone, and then, records the impulse response in an input signal of a sound that will be output from the speaker, thereby outputting echo signal components. Then, the audio signal processing system can receive the voice signal from which the echo signal is removed by subtracting the echo signal components from the voice signal received by the microphone.

However, in the case of the system in which the beginning of the echo path is unknown, bulk delay may occur. The bulk delay may be caused due to different buffering structures of the audio recording hardware and software, or unknown positions of the unknown speakers and microphones. If this bulk delay is not properly compensated, a problem that the echo signal is not properly removed may occur.

Accordingly, ways that compensate the bulk delay so as to cancel the echo signals are needed.

SUMMARY

One or more embodiments provide an audio signal processing system that compensates bulk delay by measuring the bulk delay by analyzing response characteristics of echo signals and an echo signal processing method applied to that.

According to an aspect of an exemplary embodiment, there is provided an audio signal processing system including: a speaker that is configured to output an audio signal; a microphone that is configured to receive the audio signal output by the speaker including an echo signal generated by the audio signal; an echo signal delay unit that is configured to delay the echo signal for a bulk delay time, and output the echo signal that is delayed; and an echo signal removing unit that is configured to remove the echo signal that is delayed and output by the echo signal delay unit from the audio signal received by the microphone, wherein the echo signal delay unit includes a bulk delay measuring unit that is configured to measure a bulk delay by analyzing impulse response characteristics of an echo path.

The echo signal removing unit may include an adaptive filter that adaptably models impulse response of the echo path; and a subtraction unit that subtracts the echo signal that is output from the adaptive filter from the audio signal received through the microphone; and the echo signal delay unit may measure the bulk delay by using the impulse response modeled by the adaptive filter.

The bulk delay measuring unit may measure a period of time when the magnitude of the impulse response is within a threshold value as the bulk delay.

The predetermined threshold value may be determined by using at least one of a shape of an initial peak of the impulse response and an amount of noise of the impulse response.

The echo signal delay unit may include a double talk detecting unit to determine whether a double talk situation exists, and if the double talk situation is determined by the double talk detecting unit, the bulk delay measuring unit may measure the bulk delay after the double talk situation is ended.

The audio signal processing system may include a plurality of speakers and a plurality of microphones, the echo signal delay unit may delay echo signals for a plurality of paths that is output from the plurality of speakers and is input through the plurality of microphones, respectively, and the echo signal removing unit may remove the echo signals for the plurality of paths from audio signals that are input through the plurality of microphones, respectively.

According to an aspect of another exemplary embodiment, there is provided an echo signal removing method of an audio signal processing system including a speaker and a microphone, the echo signal removing method may include outputting an audio signal through the speaker; receiving at the microphone the audio signal output by the speaker including an echo signal generated by the audio signal; delaying the echo signal for a bulk delay time; and removing the echo signal delayed by an echo signal delay unit from the audio signal received through the microphone, wherein the delaying an echo signal comprises measuring a bulk delay by analyzing impulse response characteristics of an echo path.

The removing the echo signal delayed by an echo signal delay unit may include modeling adaptably an impulse response of the echo path, and the measuring bulk delay may include measuring the bulk delay by using the impulse response modeled by an adaptive filter.

The measuring bulk delay may include measuring a period of time when the magnitude of the impulse response is within a threshold as the bulk delay.

The predetermined threshold value may be determined by using at least one of a shape of an initial peak of the impulse response and an amount of noise of the impulse response.

The echo signal removing method may include determining whether a double talk situation exists, wherein, if the double talk situation is determined in the determining whether a double talk situation, the measuring bulk delay may include measuring the bulk delay after the double talk situation is ended.

If the audio signal processing system comprises a plurality of speakers and a plurality of microphones, the delaying an echo signal may include delaying echo signals for a plurality of paths that is output from the plurality of speakers and is input through the plurality of microphones, respectively, and the removing the echo signal delayed by an echo signal delay unit may include removing the echo signals for the plurality of paths from audio signals that are input through the plurality of microphones, respectively.

BRIEF DESCRIPTION OF THE DRAWINGS

These and/or other aspects will become apparent and more readily appreciated from the following description of exemplary embodiments, taken in conjunction with the accompanying drawings of which.

Throughout the drawings, like reference numerals will be understood to refer to like parts, components and structures.

DETAILED DESCRIPTION OF EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
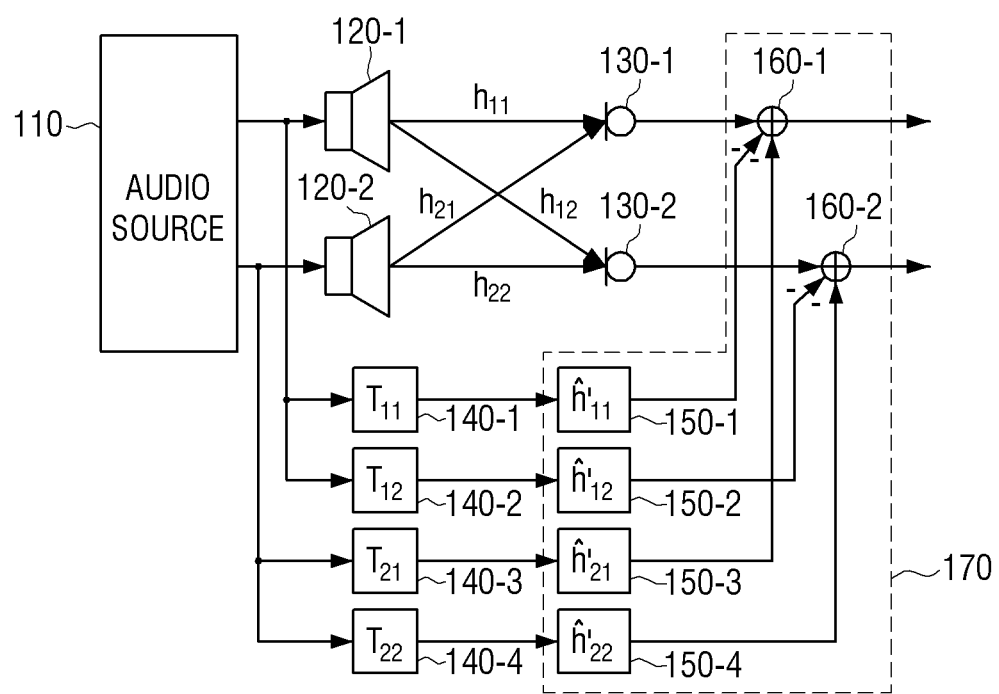
FIG. 1 is a view illustrating an audio signal processing system including two speakers and two microphones according to an exemplary embodiment.

FIG. 1 is a view illustrating an audio signal processing system according to an exemplary embodiment. As illustrated in FIG. 1, an audio signal processing system 100 includes an audio source 110, two speakers 120-1 and 120-2, two microphones 130-1 and 130-2, four echo signal delay units (T11, T12, T21, and T22) 140-1, 140-2, 140-3, and 140-4, and an echo signal removing unit 170. The echo signal removing unit 170 includes four adaptive filters (h'11, h'12, h'21, and h'22) 150-1, 150-2, 150-3, and 150-4, and two subtraction units 160-1 and 160-2. Also, the audio signal processing system 100 may be implemented as a smart television (TV) that can perform voice recognition and video calls; however, this is only one example. Therefore, the audio signal processing system 100 may be implemented in various types of electronic apparatuses such as telephones, smart phones, tablet personal computers (PCs), etc.

The audio source 110 receives audio signals from an external source. The input audio signal may be a voice signal of another party speaking when video calls are performed or audio signals that are output during content playback.

The speaker outputs the audio signal received by the audio source. The audio signal that is output by the speakers 120-1 and 120-2, and then input to the microphones 130-1 and 130-2 may be referred to as an echo signal. The echo signals output from the two speakers 120-1 and 120-2 may have four paths h11, h12, h21, and h22.

The microphones 130-1 and 130-2 receive the audio signal input from the outside. Particularly, the microphones 130-1 and 130-2 may receive not only voice signals of a user speaking, but also echo signals that are output from the speakers 120-1 and 120-2.

The echo signal delay units 140-1, 140-2, 140-3 and 140-4 delay the echo signal to compensate bulk delay, and then, outputs the echo signals. The echo signal delay units 140-1, 140-2, 140-3 and 140-4 may measure the bulk delay by analyzing the impulse response characteristics of the echo path measured in the adaptive filters 150-1, 150-2, 150-3, and 150-4. A method of measuring and compensating the bulk delay performed by the echo signal delay unit 140 will be described in detail later.

The echo signal removing unit 170 removes the echo signals from the audio signals that are input through the microphone 130-1 and 130-2. The echo signal removing unit 170 may include the adaptive filters 150-1, 150-2, 150-3, and 150-4 and the subtraction units 160-1 and 160-2.

The adaptive filters 150-1, 150-2, 150-3, and 150-4 model adaptably the impulse response of the echo paths. The adaptive filter 150 may be a finite impulse response (FIR) filter with a length of L. Then, the adaptive filters 150-1, 150-2, 150-3, and 150-4 may be implemented in a time domain or in any transform domain.

Particularly, FIR filter coefficient may be adapted to minimize error signals with a standard filter adaptation method, for example, a normalized least mean squares (NLMS) algorithm.

Then, the subtraction units 160-1 and 160-2 removes the echo signal by subtracting an output signal, that is output from the adaptive filters 150-1, 150-2, 150-3, and 150-4, from the audio signal that is input into the microphones 130-1 and 130-2.

Although the audio signal processing system 100 illustrated in FIG. 1 includes two speakers and two microphones, this is only one example. In other embodiments, the audio signal processing system 100 may include a one speaker or more than two speakers, and one microphone or more than two microphones. For example, the audio signal processing system 100 may include three speakers and three microphones. In this case, since the number of echo paths of the echo signals output from the three speakers is nine (9), the audio signal processing system 100 may include nine echo signal delay units (140), nine adaptive filters (150), and three subtraction units (160).

Figure 2:
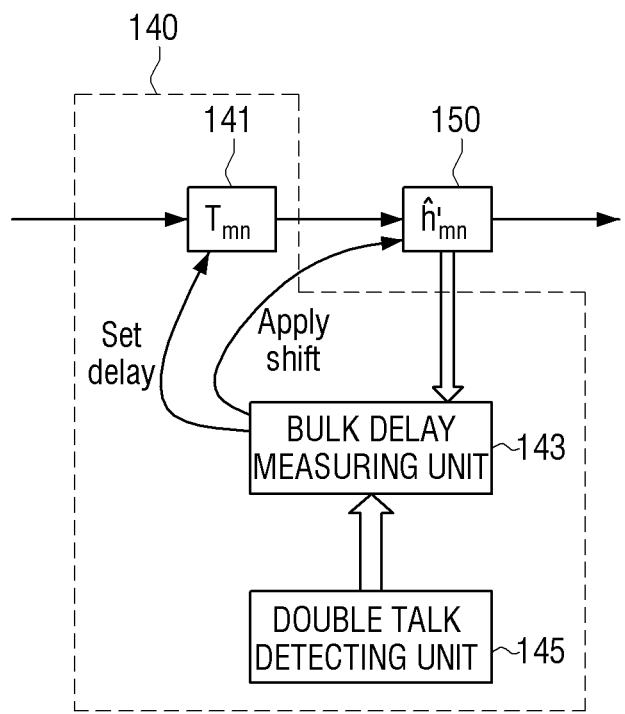
FIG. 2 is a view illustrating a configuration of an echo signal delay unit according to an exemplary embodiment.

FIG. 2 is a view illustrating a configuration of an echo signal delay unit 140 according to an exemplary embodiment. The echo signal delay unit 140, as illustrated in FIG. 2, includes a delay circuit unit (Tmn) 141, a bulk delay measuring unit 143, and a double talk detecting unit 145.

The delay circuit unit 141 generates a signal delay by p samples. The delay circuit unit 141 may implement the signal delay as an additional ring buffer of the length p or by offsetting the access of an existing ring buffer that is used to provide the input audio signals to the echo signal removing unit 170. Particularly, an initial delay value of the delay circuit unit 141 may be set to zero (0).

The bulk delay measuring unit 143 measures the bulk delay by using the impulse response of the adaptive filter 150. In detail, when the echo signal is entered, the bulk delay measuring unit 143 calculates a value corresponding to the number of samples at the beginning of the impulse response that is close to zero (0). The number of samples at the beginning of the impulse response that is close to zero may be determined as the bulk delay. In other words, the bulk delay measuring unit 143 may calculate the bulk delay by counting the number of taps from the beginning of the impulse response that have a magnitude below a threshold value T.

At this time, the threshold value T may be calculated by multiplying a factor f that is chosen between 0 and 1 and the maximum value of the impulse response. In detail, the threshold value T may be calculated by Equation 1 as follows:

$$T = f \|h[k]\|_\infty \quad \text{Equation 1}$$

where the factor f may be determined by using at least one of the shape of the initial peak of the impulse response after being converged and the amount of noise in the impulse response. In detail, if the shape of the initial peak is not sharp, since a high factor may cause misclassification of relevant samples of the impulse response that are classified as the bulk delay, the value of the factor may become smaller. Also, if local noise is generated by using fast-converging algorithm, since a bulk delay portion of the impulse response may not converge exactly to zero (0) and may exist in the form of noise, the value of the factor may be increased.

After the bulk delay d is determined by the bulk delay measuring unit 143, the measured bulk delay d may be used to perform following two processes.

1. First a delay element parameter p is set to p=d−s.
2. Then, the converged impulse response h is shifted in the left side as many as the number of d-s taps, and the rest is filled with zero. (hnew[0 ... L−1]=[h[d−s ... L−1]0 ... 0])

At this time, s may be a small number (for example, 10). That is intended to obtain a safety margin to allow for small changes in the speed of sound due to temperature changes or minor position variations that can reduce the bulk delay. Also, in the band-limited systems, a certain number of non-zero taps before the main peak (corresponding to a direct path) may exist. The number of the taps may be associated with the modeling of the system, and may not be cut off. In other words, by choosing a sufficient safety margin s based on the system bandwidth and the sampling rate, the echo cancellation may be performed more effectively.

Particularly, since the bulk delay does not change during echo signal removing operation, a process to measure and compensate the bulk delay may be performed after the system is sufficiently converged. A condition that the system is sufficiently converged may be determined by (1) assuming convergence after a certain fixed time duration, or (2) measuring the degree of convergence from the impulse response (for example, with a sharpness measure).

Simulation results using methods as described above will be described with reference to FIGS. 3, 4, and 5. White noise is used as a far-end signal, and convolved with the room impulse response to obtain a simulated microphone signal. A filter of length L=2048 is adapted by using NLMS algorithm with a step size of 0.02. The sampling rate is fs=48 kHz. The room impulse response is measured in a living-room-like environment in which a distance between the speaker and the microphone is 4 m, and truncated to 4000 samples.

Figure 3:
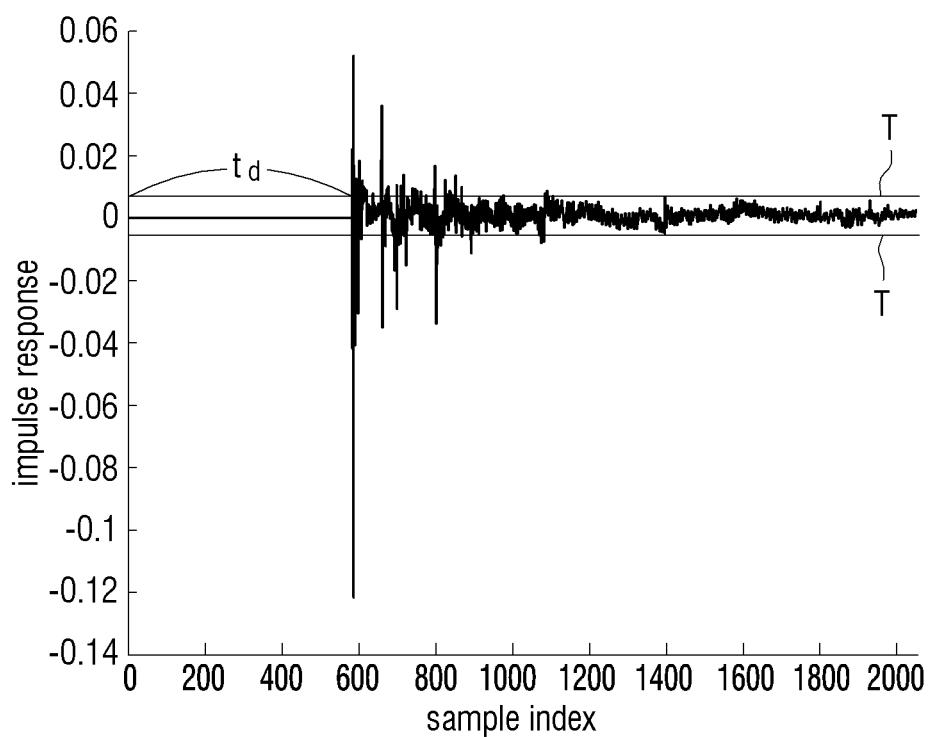
FIGS. 3 and 4 are graphs for comparing an impulse response with compensated bulk delay according to an exemplary embodiment and an impulse response with uncompensated bulk delay.

FIG. 3 is a view illustrating a converged impulse response of an adaptive filter without bulk delay compensation. At this time, due to the distance between the speaker and the microphone, significant bulk delay td is contained.

If the bulk delay measuring process as described above is applied in order to compensate the bulk delay, the factor is determined as f=0.05, the threshold value T is calculated as 0.0061, and the bulk delay d may be measured as 587 taps.

Figure 4:
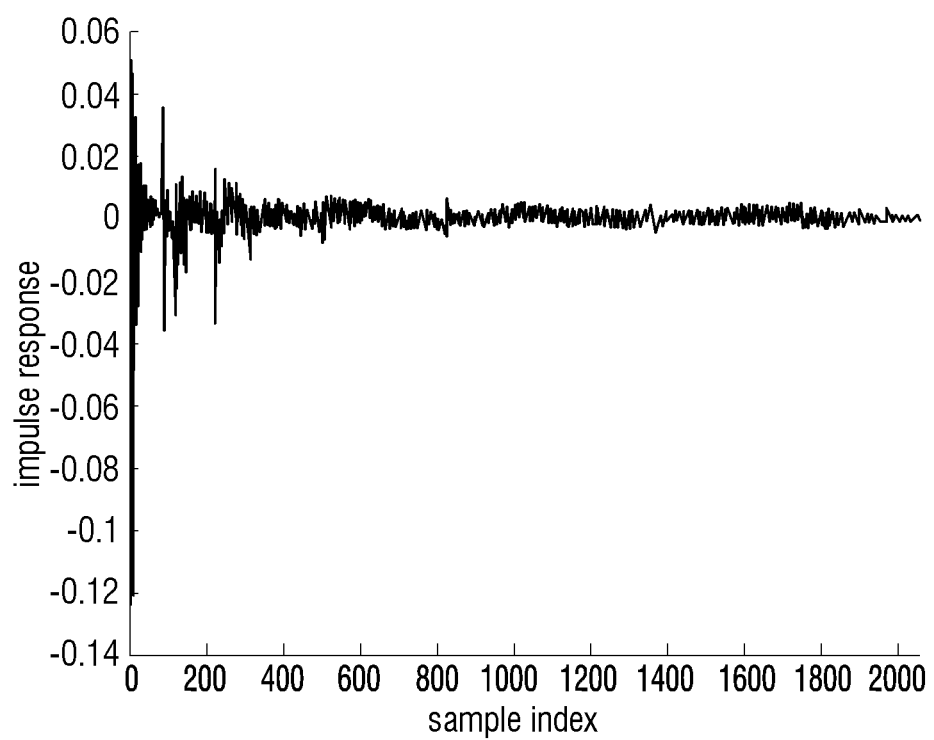

As described above, if the safety margin s of 10 is applied to the measured bulk delay, as illustrated in FIG. 4, a converged impulse response may be output. In other words, as illustrated in FIG. 4, since the impulse response having the bulk delay d removed therefrom is output, the echo signals may be exactly cancelled from the input audio signals.

Figure 5:
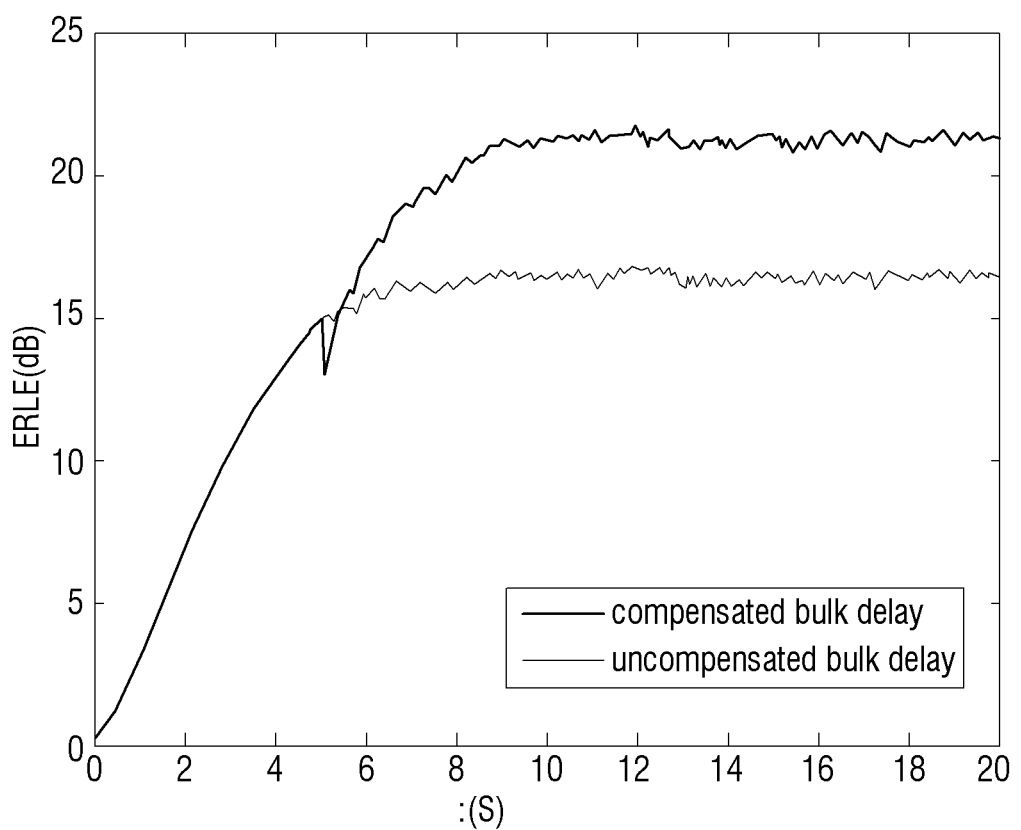
FIG. 5 is a view illustrating for comparing ERLE between the cases with compensated bulk delay and uncompensated bulk delay.

FIG. 5 is a graph for comparing and explaining the cases that the bulk delay is compensated and not compensated. In detail, FIG. 5 is a view for comparing the echo return loss enhancement (ERLE) during the convergence of a filter where bulk delay compensation is applied after five seconds, and the filter without bulk delay compensation. In other words, when the bulk delay is compensated, the ERLE is approximately 6 dB higher than when the bulk delay is not compensated.

The bulk delay compensation as described above allows significantly better modeling of the echo path, and thus increased echo cancellation performance.

Referring again to FIG. 2, the double talk detecting unit 145 detects double talk situation. In other words, in the case that there is an additional audio signal that is input to the microphone 130 (for example, user's voice, etc.) in addition to the echo signal that is output from the speaker 120 and then is input to the microphone 130, the case may be determined as the double talk situation by the double talk detecting unit 145.

Figure 6:
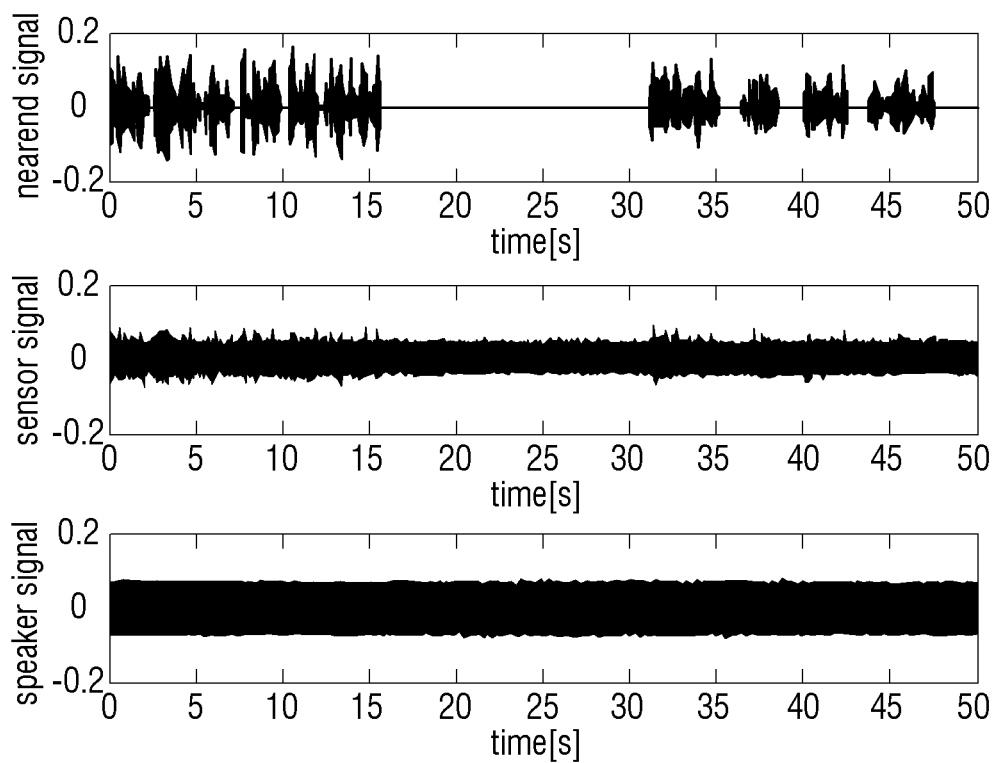
FIG. 6 is a view illustrating plots of a near end signal, a sensor signal, and a speaker signal according to an exemplary embodiment.

Particularly, if the double talk situation starts before the filter is converged as illustrated in FIG. 6, the bulk delay measuring unit 143 may measure the bulk delay after the double talk situation is finished. This is because when the double talk situation occurs, the measured bulk delay may be incorrect.

Figure 7:
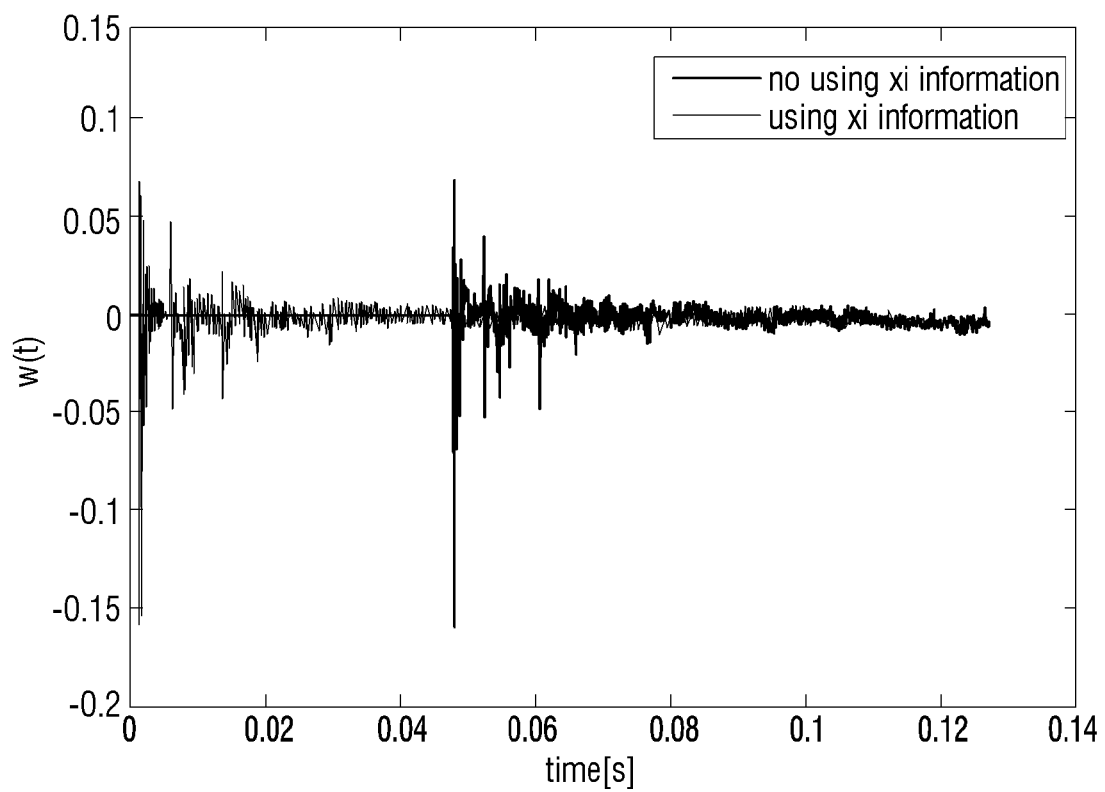
FIG. 7 is a view for comparing filter coefficients between the case that double talk information is used according to an exemplary embodiment and the case that the double talk information is not used.

FIG. 7 is a view for comparing filter coefficients between the case that double-talk information is used according to an exemplary embodiment and the case that the double-talk information is not used. In particular, by removing the impulse response by using the double-talk information (xi information) after the double talk situation is finished, as illustrated in FIG. 7, the bulk delay may be compensated more accurately.

Figure 8:
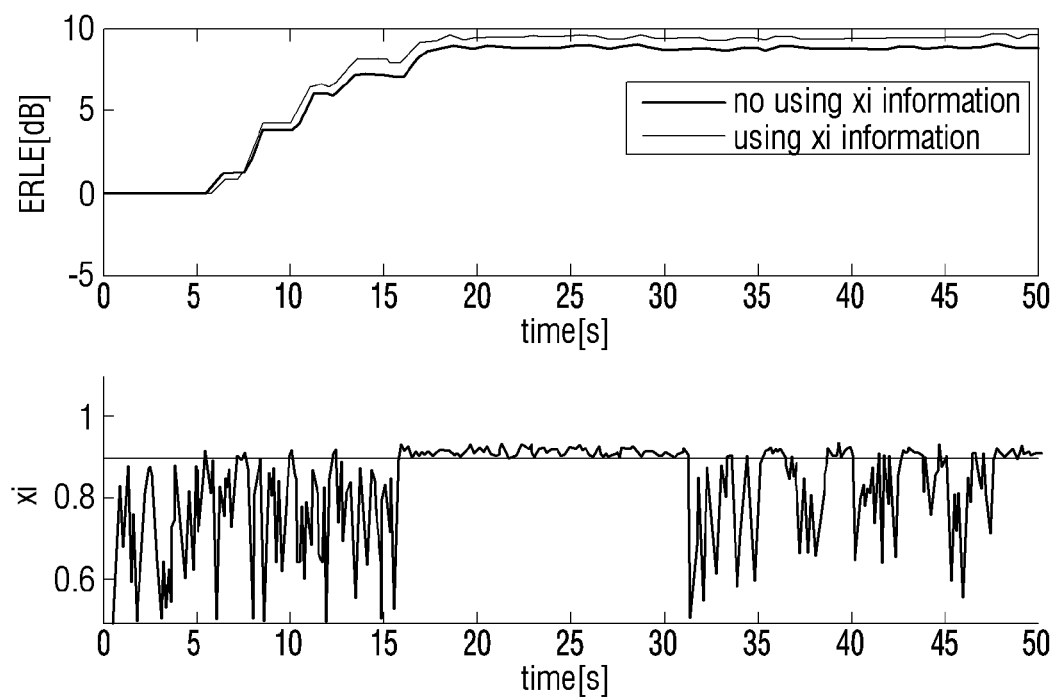
FIG. 8 is a view for comparing ERLE between the case that double talk information is used according to an exemplary embodiment and the case that the double talk information is not used.

FIG. 8 is a view for comparing ERLE between the case that the double-talk information is used according to an exemplary embodiment and the case that the double talk information is not used. In detail, when the bulk delay is measured by using the double-talk information, the ERLE may be about 1 dB higher than when the double-talk information is not used.

With the audio signal processing system as described above, the user can remove echo signals more accurately and effectively by using an adaptive filter of a short length.

Figure 9:
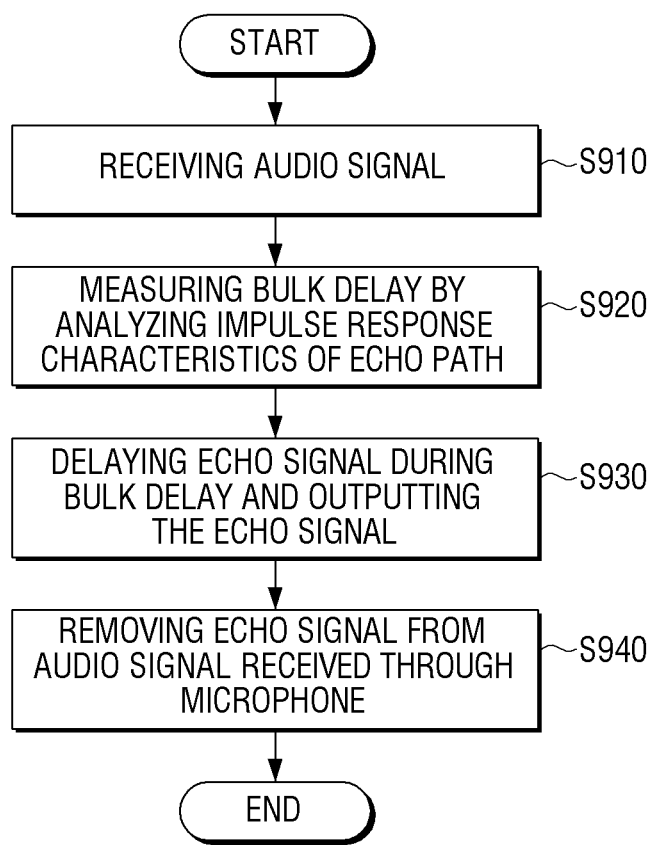
FIG. 9 is a flowchart for explaining an echo signal removing method according to an exemplary embodiment.

An echo signal removing method of an audio signal processing system 100 will be explained in detail hereinafter with reference to FIG. 9.

First, the audio signal processing system 100 receives audio signals (S910). The audio signals may be audio signals that are output from the speaker 120. Particularly, an audio signal that is input to the microphone among the audio signals that are output from the speaker 120 may be referred to as an echo signal.

Next, the audio signal processing system 100 measures bulk delay by analyzing impulse response characteristics of the echo path (S920). In detail, the audio signal processing system 100 may measure a period of time when the magnitude of the impulse response in the impulse responses that are output from an adaptive filter (for example, a FIR filter) is within the threshold value as the bulk delay. The detailed bulk delay measurement method is the same as described above referring to FIGS. 1 to 5. However, if it is determined that double talk situation occurs, the audio processing system 100 can measure the bulk delay after the double talk situation is ended.

The audio processing system 100 then delays the echo signal during the bulk delay, and then outputs the echo signal (S930).

Then, the audio processing system 100 removes the echo signal from the audio signal that is received through the microphone (S940). In detail, the audio signal processing system 100 may remove the echo signal of the audio signal that is received through the microphone by subtracting the echo signal that is output from the adaptive filter from the audio signal that is received through the microphone.

With the echo signal removing method as described above, the user can remove echo signals more accurately and effectively by using the adaptive filter of a short length.

Program codes to perform the echo signal removing method according to various exemplary embodiments as described above may be stored in a non-transitory computer-readable medium. The non-transitory computer-readable medium means not a medium to store data for a short moment like a register, a cache, a memory, etc., but a medium that can store data in a semi-permanent and can be read by devices. In detail, the various applications or programs as described above may be stored in the non-transitory computer readable medium, such as a CD, a DVD, a hard disc, a Blue-ray disc, an USB, a memory card, a ROM, etc., thereby being provided.

While the exemplary embodiments have been described, additional variations and modifications of the exemplary embodiments may occur to those skilled in the art. Therefore, it is intended that the appended claims shall be construed to include both the above exemplary embodiments and all such variations and modifications that fall within the spirit and scope of the inventive concepts.

What is claimed is:

1. An audio signal processing system comprising:
    a speaker that is configured to output an audio signal;
    a microphone that is configured to receive the audio signal output by the speaker including an echo signal generated by the audio signal;
    an echo signal delay unit that is configured to delay the echo signal received through the microphone for a bulk delay time, and output the echo signal that is delayed; and
    an echo signal removing unit that is configured to remove the echo signal that is delayed and output by the echo signal delay unit from the audio signal received by the microphone,
    wherein the echo signal delay unit comprises a bulk delay measuring unit that is configured to measure a bulk delay by analyzing impulse response characteristics of an echo path,
    wherein the bulk delay measuring unit is configured to measure a period of time when the magnitude of the impulse response is within a predetermined threshold value, and
    wherein the predetermined threshold value is determined based on a shape of an initial peak of an impulse response.

2. The audio signal processing system of claim 1, wherein the echo signal removing unit comprises:
    an adaptive filter that is configured to adaptably model an impulse response of an echo path; and
    a subtraction unit that is configured to subtract the echo signal that is output from the adaptive filter from the audio signal received through the microphone; and
    wherein the bulk delay measuring unit is configured to measure the bulk delay by using the impulse response modeled by the adaptive filter.

3. The audio signal processing system of claim 1, wherein the predetermined threshold value is determined based on the shape of the initial peak of the impulse response and an amount of noise of the impulse response.

4. The audio signal processing system of claim 1, wherein:
    the echo signal delay unit further comprises a double talk detecting unit that is configured to determine whether a double talk situation exists, and
    if the double talk detecting unit determines that the double talk situation exists, the bulk delay measuring unit is configured to measure the bulk delay after the double talk situation is ended.

5. The audio signal processing system of claim 1, further comprising a plurality of speakers and a plurality of microphones,
    wherein the echo signal delay unit is configured to delay echo signals for a plurality of paths that are output from the plurality of speakers and are input through the plurality of microphones, respectively, and
    the echo signal removing unit is configured to remove the echo signals for the plurality of paths from audio signals that are input through the plurality of microphones, respectively.

6. An echo signal removing method of an audio signal processing system that comprises a speaker and a microphone, the echo signal removing method comprising:
    outputting an audio signal through the speaker;
    receiving at the microphone the audio signal output by the speaker including an echo signal generated by the audio signal;
    delaying the echo signal for a bulk delay time; and
    removing the echo signal delayed by an echo signal delay unit from the audio signal received through the microphone,
    wherein the delaying an echo signal comprises measuring a bulk delay by analyzing impulse response characteristics of an echo path, wherein the measuring bulk delay comprises measuring a period of time when the magnitude of the impulse response is within a predetermined threshold value as the bulk delay, and wherein the predetermined threshold value is determined based on at least one of a shape of an initial peak of the impulse response.

7. The echo signal removing method of claim 6, wherein:
the removing the echo signal delayed by an echo signal delay unit comprises modeling adaptably an impulse response of an echo path, and the measuring bulk delay comprises measuring the bulk delay by using the impulse response modeled by an adaptive filter.

8. The echo signal removing method of claim 6, wherein the predetermined threshold value is determined by using at least one of abased on the shape of an the initial peak of the impulse response and an amount of noise of the impulse response.

9. The echo signal removing method of claim 6, further comprising determining whether a double talk situation exist, wherein, if it is determined that the double talk situation exists, the measuring bulk delay comprises measuring the bulk delay after the double talk situation is ended.

10. The echo signal removing method of claim 6, wherein:
the audio signal processing system comprises a plurality of speakers and a plurality of microphones, the delaying an echo signal comprises delaying echo signals for a plurality of paths that are output from the plurality of speakers and are input through the plurality of microphones, respectively, and the removing the echo signal delayed by an echo signal delay unit comprises removing the echo signals for the plurality of paths from audio signals that are input through the plurality of microphones, respectively.

11. The audio signal processing system of claim 1, wherein the bulk delay measuring unit is further configured to, in response to a shape of the initial peak of the impulse response not being sharp, set the predetermined threshold value to be lower.

* * * * *